(12) United States Patent
Montero et al.

(10) Patent No.: US 12,380,050 B2
(45) Date of Patent: Aug. 5, 2025

(54) DYNAMIC DETECTION OF SYSTEM HARDWARE CONFIGURATION WITH EMBEDDED CONTROLLER

(71) Applicant: Dell Products L.P., Round Rock, TX (US)

(72) Inventors: Adolfo S. Montero, Pflugerville, TX (US); Shao-Ku Huang, Taipei (TW)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/312,529

(22) Filed: May 4, 2023

(65) Prior Publication Data
US 2024/0370396 A1    Nov. 7, 2024

(51) Int. Cl.
    *G06F 13/40*    (2006.01)
(52) U.S. Cl.
    CPC ................ *G06F 13/4068* (2013.01)
(58) Field of Classification Search
    CPC ............................................. G09G 2310/0224
    See application file for complete search history.

(56) References Cited

U.S. PATENT DOCUMENTS

| | | | | |
|---|---|---|---|---|
| 6,958,717 B1 * | 10/2005 | Minogue | ............... | H03M 3/458 341/100 |
| 8,049,761 B1 * | 11/2011 | Riach | .................. | G06F 13/4291 345/519 |
| 9,548,757 B2 * | 1/2017 | Kabir | .................. | H03M 1/0604 |

* cited by examiner

*Primary Examiner* — Henry Tsai
*Assistant Examiner* — Juanito C Borromeo
(74) *Attorney, Agent, or Firm* — Jackson Walker L.L.P.

(57) ABSTRACT

A disclosed system includes a central processing unit (CPU), a system memory, an embedded controller (EC) and an encoder. The encoder is configured to receive a multi-bit indicator associated with a hardware resource and generate an analog signal indicative of the indicator. The EC is configured to receive and process the analog signal to obtain the indicator and to perform an action determined based on the indicator. The EC may include programmable I/O pins including one or more analog-to-digital converter (ADC) pins. In at least one embodiment, a single ADC pin of the EC is used to receive the analog signal. In at least one embodiment, the multi-bit indicator includes a minimum of three and a maximum of five bits. In these embodiments, the single pin of the EC is able to resolve 8 to 32 different values of the multi-bit indicator.

18 Claims, 3 Drawing Sheets

| Bit | Voltage(V) | EC detect |
|-----|------------|-----------|
| 111 | 2.8875 | default |
| 110 | 2.475 | Fan vendor1 |
| 101 | 2.0625 | Fan vendor2 |
| 100 | 1.75 | Fan vendor3 |
| 011 | 1.2375 | Fan vendor4 |
| 010 | 0.85 | Fan vendor5 |
| 001 | 0.4125 | Fan vendor6 |
| 000 | 0 | Fan vendor7 |

↑ 178  ↑ 402  ↑ 404

12,380,050 B2

DYNAMIC DETECTION OF SYSTEM HARDWARE CONFIGURATION WITH EMBEDDED CONTROLLER

TECHNICAL FIELD

The present disclosure to information handling systems and, more particularly, the use of information handling system resources for dedicated peripheral functions.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Mobile information handling systems, including laptop, notebook, tablet, and hybrid laptop/tablet systems sometimes referred to as 2-in-1 systems, often include a microcontroller commonly referred to as an embedded controller (EC) to handle various system tasks. In addition to hardwired functionality for performing system management and keyboard control, ECs typically include programmable input/output pins available to implement functionality desired by a maker and/or distributor of the system. Generally, the programmable resources of the EC are in high demand. Thus, the use of fewer EC pins to implement a desired function is generally preferable.

SUMMARY

Addressing the issues described above, subject matter to follow discloses, in one aspect, an information handling system including a central processing unit (CPU), a system memory, an embedded controller (EC) coupled to the CPU via, e.g., a low pin count (LPC) bus or another suitable transport, and an encoder.

The encoder is configured to receive a multi-bit indicator associated with a hardware resource and generate an analog signal indicative of the multi-bit indicator. The multi-bit indicator may reflect a system registry value or a value stored in a register of a peripheral device. The multi-bit indicator may, for example, include all or some portion of a serial number or other type of identifier for a system fan. In this example, the multi-bit identifier may include information sufficient to determine a manufacturer or source the fan. In another example, the portion of the identifier may indicate a make, model, capacity, and/or other information regarding a persistent storage resource, e.g., an M.2 form factor solid state drive (SSD) of the information handling system.

The EC is configured to receive and process the analog signal to obtain the multi-bit indicator and to perform an action determined based on the multi-bit indicator. The EC may include a plurality of programmable I/O pins including one or more analog to digital converter (ADC) pins coupled to ADC circuity of the EC. In at least one embodiment, a single ADC pin of the EC is used to receive the analog signal. In at least one embodiment, the multi-bit indicator includes a minimum of three and a maximum of five bits. In these embodiments, the single pin of the EC is able to resolve 8 to 32 different values of the multi-bit indicator.

Historically, EC-based functionality has been largely limited to performing static determinations including, as an illustrative example, determining a factory-set characteristic of the system. Disclosed subject matter provides efficient and dynamic EC-based functionality for determining hardware characteristics and performing other suitable tasks. Accordingly, in at least some embodiments, the encoder and the EC act dynamically such that the multi-bit identifier provides a dynamic indication of a current characteristic of the hardware resource and the EC is configured to respond dynamically to changes in the multi-bit identifier.

The encoder may be implemented as a passive circuit, such as a resistor network, configured to exhibit a distinct impedance for each permissible value of the multi-bit indicator. In these embodiments, the resistor network may include a plurality of input nodes, corresponding to each of the plurality of bits in the multi-bit indicator, and a corresponding plurality of internal nodes. The resistor network may include first resistors, i.e., resistors having a first resistance, connected between each adjacent pair of internal nodes. The resistor network may further include second resistors, i.e., resistors having a second resistance, connected between each input node and its corresponding internal node. In at least some implementations, the first resistance is half of the second resistance.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
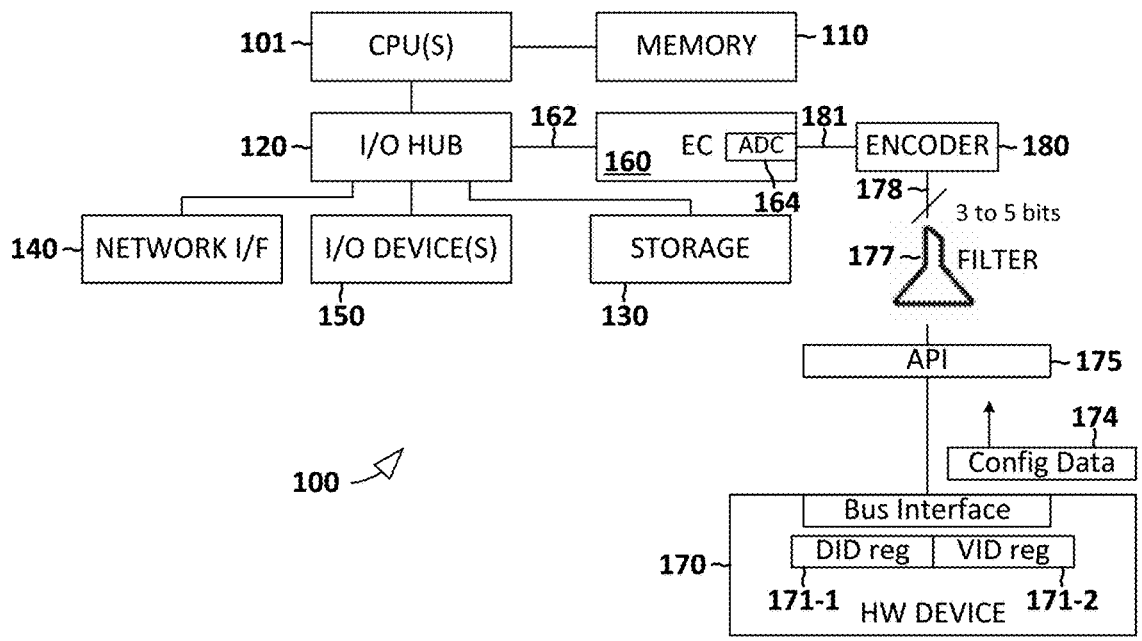
FIG. 1 illustrates an information handling system suitable for implementing an EC-based method for dynamic configuration of a hardware characteristic in accordance with disclosed subject matter.

Exemplary embodiments and their advantages are best understood by reference to FIGS. 1-5, wherein like numbers are used to indicate like and corresponding parts unless expressly indicated otherwise.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU"), microcontroller, or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

Additionally, an information handling system may include firmware for controlling and/or communicating with, for example, hard drives, network circuitry, memory devices, I/O devices, and other peripheral devices. For example, the hypervisor and/or other components may comprise firmware. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically. Thus, for example, "device 12-1" refers to an instance of a device class, which may be referred to collectively as "devices 12" and any one of which may be referred to generically as "a device 12".

As used herein, when two or more elements are referred to as "coupled" to one another, such term indicates that such two or more elements are in electronic communication, mechanical communication, including thermal and fluidic communication, thermal, communication or mechanical communication, as applicable, whether connected indirectly or directly, with or without intervening elements.

Turning to the drawings and referring now to FIG. 1, any one or more of the elements illustrated in FIG. 2 through FIG. 5 may be implemented as or within an information handling system exemplified by the information handling system 100 illustrated in FIG. 1. The illustrated information handling system includes one or more general purpose processors or central processing units (CPUs) 101 communicatively coupled to a memory resource 110 and to an input/output hub 120 to which various I/O resources and/or components are communicatively coupled. The I/O resources explicitly depicted in FIG. 1 include a network interface 140, commonly referred to as a NIC (network interface card), storage resources 130, and additional I/O devices, components, or resources 150 including as non-limiting examples, keyboards, mice, displays, printers, speakers, microphones, etc. The illustrated information handling system 100 includes an embedded controller EC 160 coupled to I/O hub 120 via suitable bus 162, e.g., a Low Pin Count (LPC) bus. EC 160 may provide or support various system management functions and, in at least some implementations, keyboard controller functions. Exemplary system management function that may be supported by EC 160 include thermal management functions supported by pulse width modulation (PWM) interfaces suitable for controlling system fans, power monitoring functions support by an analog-to-digital (ADC) signal that can be used to monitor voltages and, in conjunction with a sense resistor (not depicted), current consumption per power rail. This information could be used to, among other things, monitor battery charging or inform the user or administrator of potentially problematic power supply conditions. EC 160 may support battery management features to control charging of the battery in addition to switching between the battery and AC adapter as the active power source changes or monitoring the various battery status metrics such as temperature, charge level and overall health. EC 160 may support an Advanced Configuration and Power Interface (ACPI) compliant OS by providing status and notifications regarding power management events and by generating wake events to bring the system out of low power states.

The EC 160 of FIG. 1 further includes or supports disclosed features for dynamically detecting hardware configuration settings. In this respect, the information handling system 100 illustrated in FIG. 1 includes a hardware device 170 coupled to EC 160 through an encoder 180. Hardware device 170 may be substantially any device suitable for inclusion in an information handling system including, as illustrative examples, a thermal fan, a persistent storage device, etc.

As depicted in FIG. 1, hardware device 170 includes various configuration registers 171 including, as examples, a device identification (DID) register 171-1 and a vendor identification (VID) register 171-2. Hardware device 170 may communicate with EC 160 via an application programming interface (API) 175 enabling EC 160 to retrieve device configuration data 174 from one or more of the configuration registers 171 hardware device 170. For example, EC 160 may retrieve vendor identification information, from VID register 171-2, as the device configuration data 174. As depicted in FIG. 1, all or some portion of device configuration data 174 may be routed to an analog encoder 180, which is configured to generate an analog voltage signal 181 based on a value of all or some portion of device configuration data 174. The analog voltage signal 182 generated by encoder 180 is provided to an ADC 164 of EC 160. ADC 164 may require a degree of signal margin that limits the maximum number of voltage levels that ADC can reliably distinguish. If this maximum number of voltage levels is less than $2^N$ (2 raised to the Nth power) where N is the number of bits in device configuration data 174, one or more bits of device configurations data 174 may be removed by a filter 177 to generate filtered configuration data 178 where filtered configuration data includes M bits and $2^M$ is less than or equal to the number of voltage levels reliably distinguishable by ADC 164. FIG. 1 illustrates an implementation in which the value of M, the number of bits in filteted configuration data 178, is greater than or equal to three and less than or equal to five. In this exemplary implementation, device configuration data 178 is capable of indicating 8 to 32 distinct values.

Analog encoder 180 is, in at least some embodiments, configured to generate as many as $2^M$ voltage levels based on the value filtered configuration data 178. Embodiments of encoder 180 may employ a multi input voltage divider or other type of passive electrical circuit to produce the voltage signal 181 provided to ADC 164.

Figure 2:
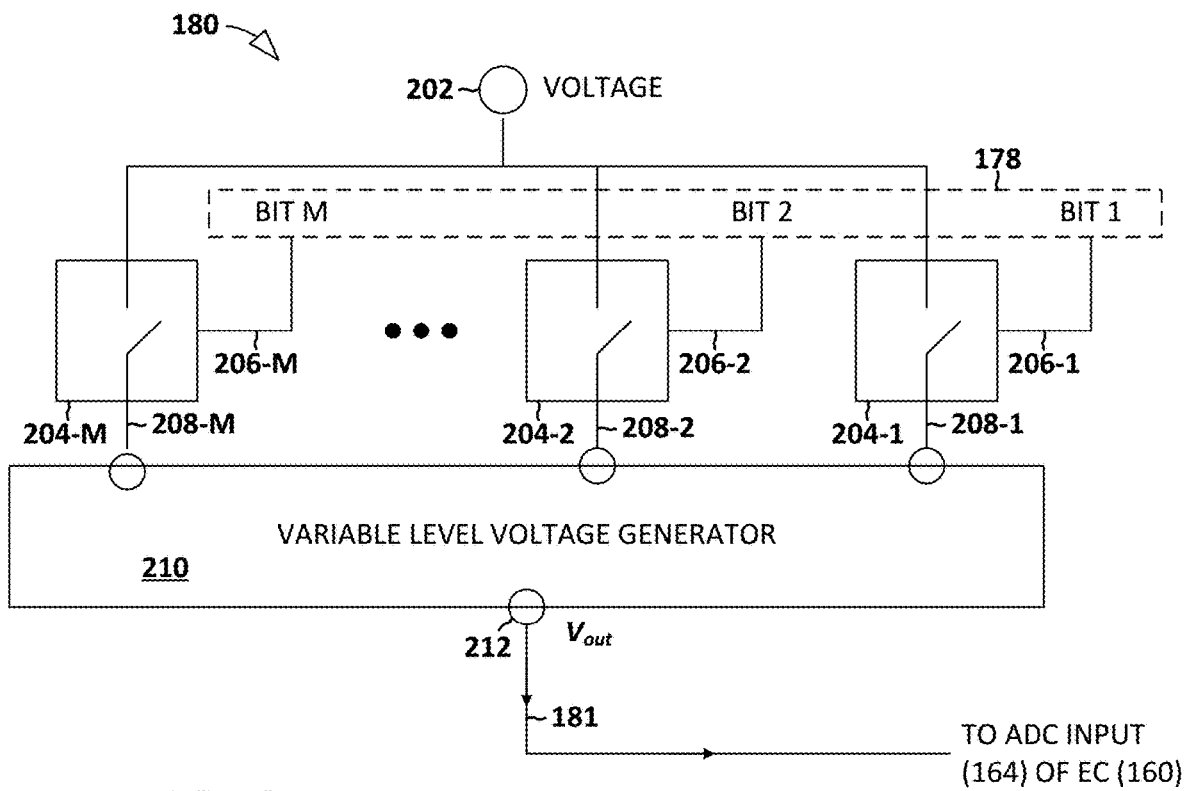
FIG. 2 illustrates a flow diagram of an EC-based method for dynamically detecting hardware configuration settings of an information handling system.

FIG. 2 illustrates an exemplary implementation of the encoder 180 introduced in FIG. 1. As depicted in FIG. 2, the encoder 180 includes a variable level voltage generator 210 configured to generate an output voltage 181, determined based on M binary inputs 206 of which three such inputs 206-1, 206-2, and 206-M are illustrated. In at least one embodiment, the inputs 206 correspond to the M bits of filtered configuration data 178 described in FIG. 1.

As depicted in FIG. 2, each input 206 controls a corresponding switch 204 that, when actuated by the corresponding input 206, closes switch 204 and connects a supply voltage 202 to an input node 208 of variable level voltage generator 210. As suggested by its name, variable level voltage generator 210 is configured to generate a output voltage 181 at output node 212 wherein the output voltage 181 is determined based on the binary value indicated by inputs 206. Each unique value of inputs 206 results in a correspondingly unique output voltage 181. The output node 212 is depicted coupled to an ADC input 164 of EC 160.

Figures 3, 4:
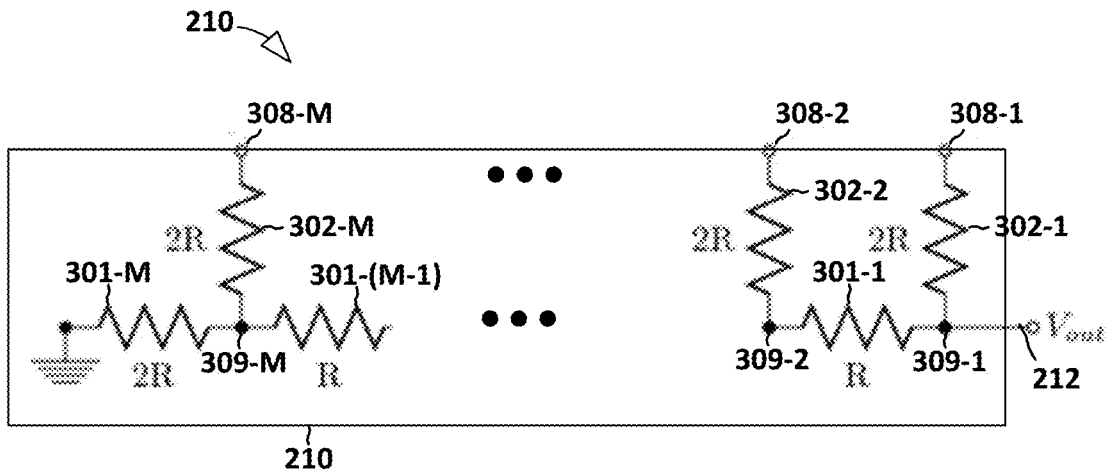
FIG. 3 illustrates aspects of an encoder suitable for use in conjunction with disclosed subject matter.
FIG. 4 illustrates additional aspects of the encoder.

FIG. 3 illustrates an exemplary implementation of the variable level voltage generator 210 introduced in FIG. 2. As depicted in FIG. 3, variable level voltage generator 210 includes M input nodes 308, each of which is coupled to a corresponding one of the nodes 208 of FIG. 2. The illustrated variable level voltage generator 210 is implemented as a resistor network including a first group of M resistors 301-1 through 301-M, each having a first resistance (R), except resistor 301-M, which has a resistance of 2R, and a second group of M resistors 302-1 through 302-M having a second resistance (2R) that is twice the resistance of the resistors 301 in the first group. Thus, for example, if the resistors 301 in the first group have a resistance of 1K ohms, The resistors 302 in the second group would have a resistance of 2K ohms.

Each of the M resistors in the second group 302 is connected between an input node 308 and a corresponding internal node 309. Each of the M resistors in the first group 301 is connected between an adjacent pair of internal nodes 309 with the "Mth" resistor 301-M connected between internal node 309-M and ground and the first internal node 309-1 connected to the output node 212.

FIG. 4 illustrates a voltage level table 400 for an exemplary use case for dynamic determination of a thermal fan vendor. As depicted in table 400, the filtered configuration data 178 is a 3-bit value for a total of 8 permissible values. Each value is associated with an analog voltage level 402 between 0 v and 3V and each voltage level indicates a specific fan vendor 404 or, in the case of a value of 111 for filtered configuration data, a default vendor. Although FIG. 4 illustrates an example involving 3 bits of configuration data and a thermal fan as the hardware device, other implementations may pertain to a different hardware device and may include more than 3 bits of configuration data.

Figure 5:
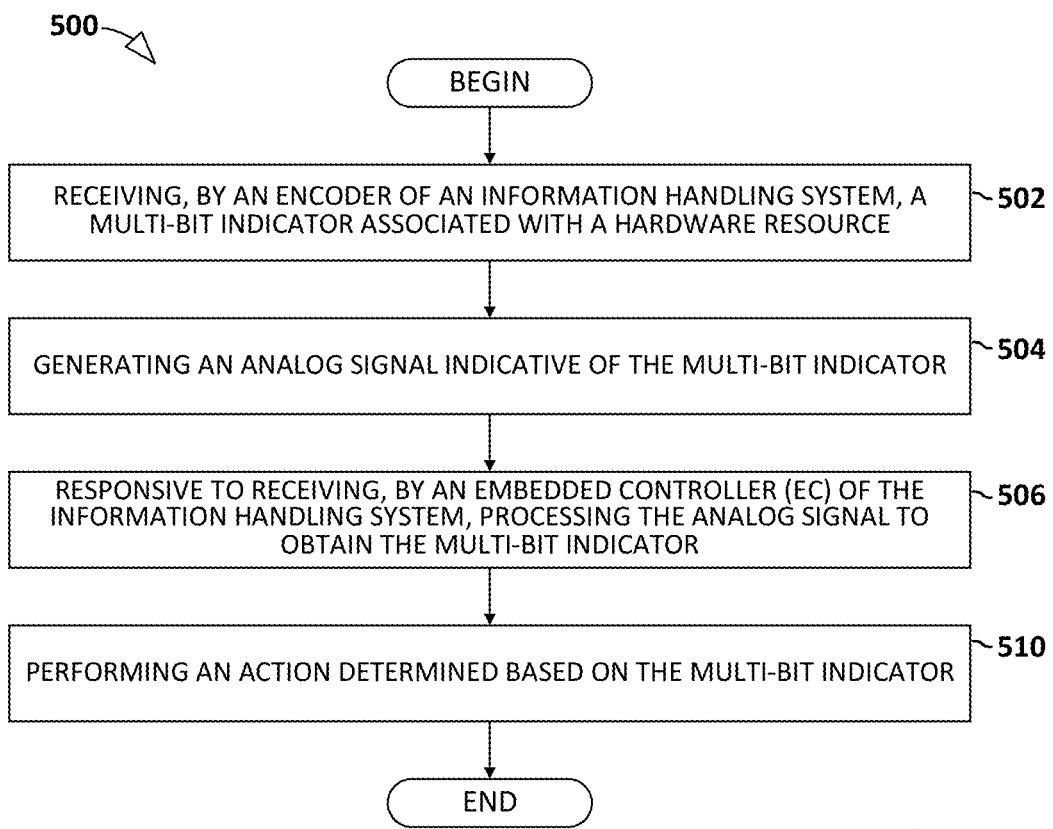
FIG. 5 illustrates a table associated with an exemplary use case for disclosed subject matter.

FIG. 5 illustrates a flow diagram of a method 500 for dynamic determination of a hardware device configuration in accordance with disclosed subject matter. As depicted in FIG. 5, method 500 include receiving (step 502), by an encoder of an information handling system, a multi-bit indicator associated with a hardware resource and generating (step 504) an analog signal indicative of the multi-bit indicator. An embedded controller, configured to receive the analog signal, processes (step 506) the analog signal with an A/D converter to obtain the multi-bit indicator. The EC may then perform (step 510) an action determined based on the multi-bit indicator. As an example using the table 400 depicted in FIG. 4, the EC may determine an adjustment of a thermal fan speed based, at least in part, on the fan vendor.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. An information handling system, comprising:
a central processing unit (CPU);
a system memory, accessible to the CPU;
an encoder configured to:
receive a multi-bit indicator associated with a hardware resource; and generate an analog signal indicative of the multi-bit indicator; and an embedded controller (EC) coupled to the CPU wherein the EC is configured to:

receive and process the analog signal to obtain the multi-bit indicator; and perform an action determined based on the multi-bit indicator;

wherein the encoder includes a passive circuit configured to exhibit a distinct impedance for each permissible value of the multi-bit indicator, wherein the passive circuit comprises:

a plurality of input nodes corresponding to each of a plurality of bits in the multi-bit indicator; and a plurality of internal nodes including an internal node corresponding to each input node.

2. The information handing system of claim 1, wherein the multi-bit identifier comprises a dynamic multi-bit identifier indicative of a current characteristic of the hardware resource.

3. The information handing system of claim 1, wherein the EC is configured to receive the analog signal via a single pin of the EC.

4. The information handing system of claim 3, wherein the single pin of the EC comprises an analog to digital converter pin of the EC.

5. The information handing system of claim 1, wherein the passive circuit comprises a resistor network.

6. The information handing system of claim 5, wherein the resistor network includes:

a plurality of first resistors including a first resistor connected between each adjacent pair of internal nodes; and a plurality of second resistors, including a second resistor connected between each input node and its corresponding internal node.

7. The information handing system of claim 6, wherein each of the plurality of first resistors has a first resistance and each of the plurality of second resistors has a second resistance wherein, the first resistance is half of the second resistance.

8. The information handing system of claim 6, wherein the multi-bit indicator includes a minimum of 3 bits and a maximum of 5 bits.

9. The information handing system of claim 1, the plurality of bits comprises vendor identification information indicative of a vendor of the hardware resource.

10. A method comprising, comprising:

receiving, by an encoder of an information handling system, a multi-bit indicator associated with a hardware resource;

generating an analog signal indicative of the multi-bit indicator;

responsive to receiving, by an embedded controller (EC) of the information handling system, processing the analog signal to obtain the multi-bit indicator; and performing an action determined based on the multi-bit indicator;

wherein the encoder includes a passive circuit configured to exhibit a distinct impedance for each permissible value of the multi-bit indicator, wherein the passive circuit comprises:

a plurality of input nodes corresponding to each of a plurality of bits in the multi-bit indicator; and a plurality of internal nodes including an internal node corresponding to each input node.

11. The method of claim 10, wherein the multi-bit identifier comprises a dynamic multi-bit identifier indicative of a current characteristic of the hardware resource.

12. The method of claim 10, wherein the EC is configured to receive the analog signal via a single pin of the EC.

13. The method of claim 12, wherein the single pin of the EC comprises an analog to digital converter pin of the EC.

14. The method of claim 10, wherein the passive circuit comprises a resistor network.

15. The method of claim 14, wherein the resistor network includes:

a plurality of first resistors including a first resistor connected between each adjacent pair of internal nodes; and a plurality of second resistors, including a second resistor connected between each input node and its corresponding internal node.

16. The method of claim 15, wherein each of the plurality of first resistors has a first resistance and each of the plurality of second resistors has a second resistance and wherein, the first resistance is half of the second resistance.

17. The method of claim 15, wherein the multi-bit indicator includes a minimum of 3 bits and a maximum of 5 bits.

18. The method of claim 10, the plurality of bits comprises vendor identification information indicative of a vendor of the hardware resource.

* * * * *